United States Patent
Kyung et al.

(10) Patent No.: US 7,079,834 B2
(45) Date of Patent: Jul. 18, 2006

(54) MOBILE STATION IDENTIFICATION SYSTEM AND METHOD

(75) Inventors: Chan Ho Kyung, Inchon (KR); Jong Hoe Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 241 days.

(21) Appl. No.: 10/750,930

(22) Filed: Dec. 30, 2003

(65) Prior Publication Data

US 2005/0009504 A1    Jan. 13, 2005

(30) Foreign Application Priority Data

Jul. 10, 2003  (KR) ..................... 10-2003-0046941

(51) Int. Cl.
*H04M 1/66*    (2006.01)

(52) U.S. Cl. .................. 455/410; 455/558; 455/411; 455/461; 375/240

(58) Field of Classification Search ................ 455/558, 455/411, 410, 461; 375/240
See application file for complete search history.

(56) References Cited

U.S. PATENT DOCUMENTS 6,748,227 B1 *  6/2004  Rollender ................... 455/458

OTHER PUBLICATIONS

3GPP TSG-CN WG3#22, 3GPP TS 29.061 v5.1.0(Mar. 2002) CR p. 52, www.3gpp.org/ftp/tsg_cn/TSG_CN/TSGN_16/Docs/PDF/NP-020153.pdf.*

* cited by examiner

*Primary Examiner*—Nick Corsaro
*Assistant Examiner*—Charles Shedrick
(74) *Attorney, Agent, or Firm*—Lee, Hong, Dagerman, Kang & Schmadeka

(57) ABSTRACT

A method for identifying a mobile communications device in a mobile communications network is provided. The method comprises determining an identifier for a mobile communications device, the identifier comprising at least one of a first field, a second field, and a third field; including in the first field a mobile country code (MCC) for identifying a country to which the mobile communications device belongs; including in the second field a mobile network code (MNC) for identifying a network to which the mobile communications device belongs in the country; including in the third field a mobile station identification number (MSIN) for identifying the mobile communications device in the network; and including padding values in the third field, when the length of the MSIN is less than the length of the third field.

27 Claims, 9 Drawing Sheets

MCC  Mobile Country Code
MNC  Mobile Network Code
MSIN Mobile Station Identifier Number
NMSI National Mobile Station Identity
IMSI International Mobile Station Identity

| IMSI_11_12 | | | | | | | | | | | | |
|---|---|---|---|---|---|---|---|---|---|---|---|---|
| Padding (00) | | MCC(3-digit) | | | MNC(3-digit) | | | MSIN(4-digit) | | | | |
| 12 | 11 | 10 | 9 | 8 | 7 | 6 | 5 | 4 | 3 | 2 | 1 | |

IMSI_S

MOBILE STATION IDENTIFICATION SYSTEM AND METHOD

CROSS REFERENCE TO RELATED APPLICATIONS

Pursuant to 35 U.S.C. § 119(a), this application claims the benefit of earlier filing date and right of priority to Korean Patent Application No. 2003-46941, field on Jul. 10, 2003, the content of which is hereby incorporated by reference herein in its entirety.

BACKGROUND OF THE INVENTION

1. Field of the Invention

The present invention relates to a mobile station identification system and, more particularly, to a method of using an international mobile station identity (IMSI) to identify a mobile communications device (i.e., a mobile station) to a base station in a mobile communications network.

2. Discussion of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G is used to refer to the analog phone system, known as an AMPS (Advanced Mobile Phone Service) phone systems. 2G is commonly used to refer to the digital cellular systems that are prevalent throughout the world, and include CDMA-One, Global System for Mobile communications (GSM), and Time Division Multiple Access (TDMA). 2G systems can support a greater number of users in a dense area than can 1G systems.

3G is commonly used to refer to the digital cellular systems currently being developed. Recently, third-generation (3G) CDMA communication systems have been proposed including proposals, such as cdma2000 and W-CDMA. These 3G communication systems are conceptually similar to each other with some significant differences.

A cdma2000 system is a third-generation (3G) wideband, spread spectrum radio interface system which uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

FIG. 1 illustrates a cdma2000 network architecture, wherein a subscriber uses a mobile communications device or a Mobile Station (MS) to access network services. The Mobile Station may be a portable communications unit, such as a hand-held cellular phone, a communication unit installed in a vehicle, or even a fixed-location communications unit.

The electromagnetic waves from the Mobile Station are transmitted by the Base Transceiver System (BTS) also known as node B. The BTS consists of radio devices such as antennas and equipment for transmitting radio waves. The Base Controller Station (BSC) receives the transmissions from one or more BTS's. The BSC provides control and management of the radio transmissions from each BTS by exchanging messages with the BTS and the Mobile Switching Center (MSC) or Internal IP Network. The BTS's and BSC are part of the Base Station (BS).

The BS exchanges messages with and transmits data to a Circuit Switched Core Network (CSCN) and Packet Switched Core Network (PSCN). The CSCN Provides traditional voice communications and the PSCN provides data communications for Internet applications and multimedia services.

The Mobile Switching Center (MSC) portion of the CSCN provides switching for traditional voice communications to and from an Mobile Station and may store information to support these capabilities. The MSC may be connected to one or more BS's as well as other public networks, for example a Public Switched Telephone Network (PSTN) or Integrated Services Digital Network (ISDN). A Voice Location Register (VLR) is used to retrieve information for handling voice communications to or from a visiting subscriber. The VLR may be within the MSC and may serve more than one MSC.

A user identity is assigned to the Home Location Register (HLR) of the CSCN for record purposes such as subscriber information, for example Electronic Serial Number (ESN), Mobile Directory Number (MDR), Profile Information, Current Location, and Authentication Period. The Authentication Center (AC) manages authentication information related to the Mobile Station. The AC may be within the HLR and may serve more than one HLR. The interface between the SC and the HLR/AC is an IS-41 standard interface.

The Packet Data Serving Node (PDSN) portion of the PSCN provides routing for packet data traffic to and from Mobile Station. The PDSN establishes, maintains, and terminates link layer sessions to the Mobile Station's and may interface with one of more BS and one of more PSCN.

The Authentication, Authorization and Accounting (AAA) Server provides Internet Protocol authentication, authorization and accounting functions related to packet data traffic. The Home Agent (HA) provides authentication of MS IP registrations, redirects packet data to and from the Foreign Agent (FA) component of the PDSN, and receives provisioning information for users from the AAA. The HA may also establish, maintain, and terminate secure communications to the PDSN and assign a dynamic IP address. The PDSN communicates with the AAA, HA and the Internet via an Internal IP Network.

FIG. 2 shows a layered architecture diagram of the cdma2000 system. Layered architecture is a form of hierarchical modularity used in data network design. All major emerging communication network technologies rest on the layers of the International Organization for Standardization (ISO/OSI) model, illustrated in FIG. 2. A layer performs a category of functions or services. The OSI model defines a Physical Layer 20 (Layer-1) which specifies the standards for the transmission medium, a Link Layer 30 (Layer-2), a Network Layer 40 (Layer-3) which implements routing and flow control for the network, a Transport Layer 50 (Layer-4) and Upper Layers 60 (Layers-5 to 7).

Link Layer 30 and Data Link Protocols (DLP) are used to mitigate the effects of impairments introduced by the physical transmission medium. A Radio Link Protocol (RLP) is designed for the wireless system to deal specifically with the types of impairments found on the radio link and comprises mechanisms to deal with errors on the communications link, delays encountered in transmitting information, lost information, bandwidth conservation, and contention resolution.

The Transport Layer 50 provides reliable and transparent transfer of data between end points. It provides end-to-end error recovery and flow control. For the Internet based protocol model, the Transport Control Protocol (TCP) mainly corresponds to the Transport Layer of the OSI model.

Referring to FIG. 3, a data link protocol architecture layer for a wireless network, and more particularly for a cdma2000 system is provided. The upper layers 60, corresponding to Layer-5 to 7, contain three basis services; voice services, end-user data-bearing services and signaling. Voice services 62 include PSTN access, mobile-to-mobile voice services, and Internet telephony. End-user data-bearing services are services that deliver any form of data on behalf of a mobile end user and include packet data applications (e.g., IP service) 61, circuit data applications (e.g., asynchronous fax and B-ISDN emulation services) 63, and SMS. Signaling services control all aspects of mobile operation.

Voice services 62 may utilize directly the services provided by the LAC services. Signaling services 70 are illustrated over layers 40, 50 and 60 to indicate that the signaling information is exchanged between all layers corresponding to Layer-3 to 7.

The Transport Layer 50, corresponding to Layer-4, includes the Transport Control Protocol (TCP) 51 and the User Datagram Protocol (UDP) 52. A Hyper Text Transport Protocol (HTTP), a Real-time Transport Protocol (RTP), or other protocols may also be present.

The Link Layer 30, corresponding to Layer-2, is subdivided into the Link Access Control (LAC) sublayer 32 and the Medium Access Control (MAC) sublayer 31. The link layer provides protocol support and control mechanisms for data transport services and performs the functions necessary to map the data transport needs of the upper levels 60 into specific capabilities and characteristics of the physical layer 20. The Link Layer may be viewed as an interface between the upper layers and the Physical Layer 20.

The separation of MAC 31 and LAC 32 sublayers is motivated by the need to support a wide range of upper layer services, and the requirement to provide for high efficiency and low latency data services over a wide performance range (from 1.2 Kbps to greater than 2 Mbps). Other motivators are the need for supporting high QoS delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer manages point-to point communication channels between upper layer entities and provides framework to support a wide range of different end-to-end reliable link layer protocols.

The MAC sublayer 31 facilitates complex multimedia, multi-services capabilities of 3G wireless systems with Quality of Service (QoS) management capabilities for each active service. MAC Control States 35 includes procedures for controlling the access of data services (packet and circuit) to the physical layer 20, including the contention control between multiple services from a single user, as well as between competing users in the wireless system.

Best Effort Delivery 33 provides for reasonably reliable transmission over the radio link layer using a Radio Link Protocol (RLP) for a best-effort level of reliability. Multiplexing and Quality of Service (QoS) Control 34 is responsible for enforcement of negotiated QoS levels by mediating conflicting requests from competing services and the appropriate prioritization of access requests.

The Physical Layer 20, corresponding to Layer-1, is responsible for coding and modulation of data transmitted over the air. The Physical Layer 20 conditions digital data from the higher layers so that the data may be transmitted over a mobile radio channel reliably. The Physical Layer 20 maps user data and signaling, which are delivered by the MAC sublayer 31 over multiple transport channels, into a physical channels and transmits the information over the radio interface. In the transmit direction, the functions performed by the Physical Layer 20 include channel coding, interleaving, scrambling, spreading and modulation. In the receive direction, the functions are reversed in order to recover the transmitted data at the receiver.

The International Telecommunications Union (ITU) originally spearheaded the 3G (Third Generation) standard for mobile communications systems, pursuant to the International Mobile Telephony 2000 (IMT2000) project. IMT2000 provides a vision for a single global standard for wireless networks perceived as the global 3G system. In a 3G system, the next generation of mobile communications systems will offer enhanced services, such as multimedia and video. The main 3G technologies include Universal Mobile Telecommunications System (UMTS) and CDMA2000™.

UMTS provides an enhanced range of multimedia services. UMTS will speed convergence between telecommunications, information technology, media and content industries to deliver new services and create fresh revenue generating opportunities. UMTS will deliver low cost, high capacity mobile communications offering data rates as high as 2 Mbps under stationary conditions with global roaming and other advanced capabilities. The specifications defining UMTS are formulated by Third Generation Partnership Project (3GPP).

The CDMA2000™ standards family defines the use of Code Division Multiple Access (CDMA) technology to meet the requirements for 3G wireless communication systems. These standards have been developed through comprehensive proposals from Qualcomm. CDMA2000 was one of the first 3G IMT-2000 technologies to be commercially deployed, in late 2000. It offers twice the voice capacity and data speed (up to 307 Kbps) on a single 1.25 MHz (1X) carrier in a new or an existing spectrum. CDMA2000 1X is also known as IS-2000, MC-1X and IMT-CDMA MultiCarrier 1X and 1xRTT. The specifications defining CDMA2000 are formulated by Third Generation Partnership Project 2 (3GPP2).

International Telecommunications Union-Telecommunication Standardization Sector (ITU-T) is an international body that develops worldwide standards for telecommunications technologies. These standards are grouped together in series, which are prefixed with a letter indicating the general subject and a number specifying the particular standard. ITU-T Series E, for example, deals with the overall network operation, telephone service, service operation and human factors. Particularly, ITU-T E.212 provides for an International Mobile Subscriber Identity (IMSI).

IMSI is a unique identifier allocated to each mobile subscriber in a GSM and UMTS network. IMSI includes a Mobile Country Code (MCC), a Mobile Network Code (MNC) and a Mobile Station Identification Number (MSIN), as illustrated in FIG. 4. MCC is a 3-digit number uniquely identifying a given country. MNC is either a 2 or 3-digit number used to uniquely identify a given network from within a specified country. MNC is used in identifying various networks in a country using the same MCC.

The manufacturer typically assigns the MSIN. The MSIN comprises a maximum of 10 digits, and is used in identifying a mobile communications device or a mobile station in each network using the same MNC. The combination of the MNC and the MSIN is referred to as national mobile station identity (NMSI), which uniquely identifies a mobile station within its home country.

Generally, an IMSI is constructed with maximum 15 digits. IMSI as illustrated in FIG. 4 is used for assigning an internationally generic identifier number to a mobile station. Hence, even when a mobile station is roaming internationally, a servicing base station or communications network can determine in which network and country a mobile station is registered, based on the values of MCC and MNC. Thus, IMSI simplifies and facilitates billing practices in a roaming network, whether locally or internationally.

In the cdma2000 system, IMSI is classified into two types. A first type is class 0 IMSI and the other is class 1 IMSI. Class 0 IMSI has 15 digits, wherein class 1 IMSI has digits less than fifteen. Referring to FIG. 5, a class 1 IMSI is illustrated. IMSI includes a MCC and an IMSI_S, wherein the MCC field coincides with $11^{th}$ and $12^{th}$ digits of IMSI (IMSI_11_12). As shown, in this example, the overall length of IMSI is 13 digits. MNC and MSIN fields are 2 digits and 8 digits, respectively. Thus, the length of IMSI_S of cdma2000 is 10 digits. Hence, IMSI_11_12 coincides with the least two significant digits of MCC.

Typically, IMSI_S corresponds to MSIN as provided in ITU-T E.212 and is constructed with 10 digits. If MSIN is 10 digits, IMSI_S is constructed with 10 digits. If MSIN is less than 10 digits, however, or if the overall length of IMSI is 10 digits or is greater than 10 digits, IMSI_S includes the least significant 10 digits of the IMSI. Referring to FIGS. 6 to 8, other exemplary class 1 IMSI structures are illustrated, wherein IMSI_11_12 fails to coincide with the MNC field as recommended in ITU-T E.212.

Referring to FIG. 6, the overall length of IMSI is 12 digits. MNC and MSIN are 2 digits and 5 digits, respectively, and MCC is 3 digits. Hence, in order to meet the overall length of IMSI equal to 12 digits, padding bits (e.g., zero bits) are provided to fill the 2 most significant positions, provided here as IMSI_11_12. As such, in this case, since the length of IMSI_S of cdma2000 is 10 digits, IMSI_11_12 is padded with padding bits to provide the total length of 12 digits.

Referring to FIG. 7, if MNC and MSIN are 3 digits and 7 digits, respectively, the length of IMSI_S of cdma2000 is 10 digits. Hence, IMSI_11_12 coincide with the least two significant digits of MCC.

Referring to FIG. 8, if MNC and MSIN are 3 digits and 4 digits, respectively, the MCC is 3 digits. Hence, in order to meet the 12-digit length, padding bits are added in the most significant position of the IMSI. In this case, since length of IMSI_S of cdma2000 is 10 digits, IMSI_11 and IMSI_12 include a padding digit each.

A problem is associate with the above padding method, however. That is, according to provisions of ITU-T E.212, the IMSI_11_12 should coincide with the MNC field. This coincidence would enable a base station in the cdma2000 system to easily determine the network and country to which a mobile station belongs. A solution to the above problem is needed.

SUMMARY OF THE INVENTION

In accordance with one embodiment, a method of identifying a mobile terminal in a mobile communications network is provided. The method comprises determining an international mobile station identity (IMSI) for a mobile terminal, the IMSI comprising a mobile country code (MCC), a mobile network code (MNC) and a mobile station identifier number (MSIN); determining a first field having a first fixed length and containing the MCC; determining a second field having a second fixed length and containing at least a part of the MNC; determining a third field having a third fixed length containing the MSIN and at least one padding value, when length of the MSIN is less than the third fixed length.

When the length of the MNC is greater than the second fixed length, then the MNC is parsed into at least a first part and a second part, so that the second field comprises the first part and the third field comprises the MSIN and the second part. When total length of the MSIN and the second part is less than the third fixed length, then at least one padding value is added to the third field; and transmitting the first, second and third fields to the mobile communications network. When length of MNC is equal to the second fixed length, the second field comprises the MNC, and the third field comprises the MSIN.

In one embodiment, the sum of the first fixed length, the second fixed length and the third fixed length is equal to 15 digits; such that the first fixed length is equal to 3, the second fixed length is at least 2, and the third fixed length is 10. In some embodiments, the first part of the MNC comprises the most significant digits of the MNC and the second part of the MNC comprises the least significant digit of the MNC when the length of the MNC is greater than the second fixed length and when total length of the MSIN and the second part is less than the third fixed length, then the at least one padding value is added to the third field between the MSIN and the second part. When the length of the MNC is not greater than the second fixed length, and when total length of the MSIN is less than the third fixed length, then the at least one padding value is inserted in most significant position of the third field.

In another embodiment, a system using a data structure for identifying a mobile communications device in a cdma2000 network, the data structure comprising at least one of a first field, a second field, and a third field, wherein the first field comprises an X-digit mobile country code for identifying a country to which the mobile communications device belongs; the second field comprises a Y-digit mobile network code for identifying a network to which the mobile communications device belongs in the country, when Y is not greater than length of the second field; the second field comprises at least a first part of the Y-digit mobile network code (MNC), when Y is greater than length of the second field; and the third field comprises a second part of the Y-digit MNC, when Y is greater than length of the second field; a Z-digit mobile station identification number (MSIN) for identifying the mobile communications device in the network; and padding bits, when Z is smaller than length of the third field.

The first part of the MNC comprises most significant digits of the MNC. The second part of the MNC comprises least significant digits of the MNC. The least significant positions in the third field comprise the MSIN. The most significant positions of the third field comprise the second part of the MNC, when Y is greater than the length of the second field. The most significant positions of the third field comprise the padding bits, when Y is not greater than the length of the second field. In accordance with one embodiment, X is equal to 3, Y is equal to at least 2, and X+Y+Z is less than 16, for example. The first part of the MNC is 2 digits, and the second part of the MNC is 1 digit.

In another embodiment, a method for identifying a mobile communications device in a mobile communications network is provided. The method comprises determining an identifier for a mobile communications device, the identifier comprising at least one of a first field, a second field, and a third field; including in the first field a mobile country code (MCC) for identifying a country to which the mobile communications device belongs; including in the second field a mobile network code (MNC) for identifying a network to which the mobile communications device belongs in the country; including in the third field a mobile station identification number (MSIN) for identifying the mobile communications device in the network; and including padding values in the third field, when the length of the MSIN is less than the length of the third field.

The padding values are added to left side of the MSIN, in the third field, in some embodiments. The MNC is divided into a first part and a second part, when length of MNC is larger than length of the second field and the second part is included in the third field, and the first part of MNC in the second field. The second part of MNC is included in most significant portion of the third field, in one embodiment.

The padding values can be added between the second part of MNC and the MSIN, when MSIN is smaller than length of the third field. Further, the padding values are added to the most significant portion of the third field, when MSIN is smaller than length of the third field and when MNC is not larger than length of the second field.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 1:
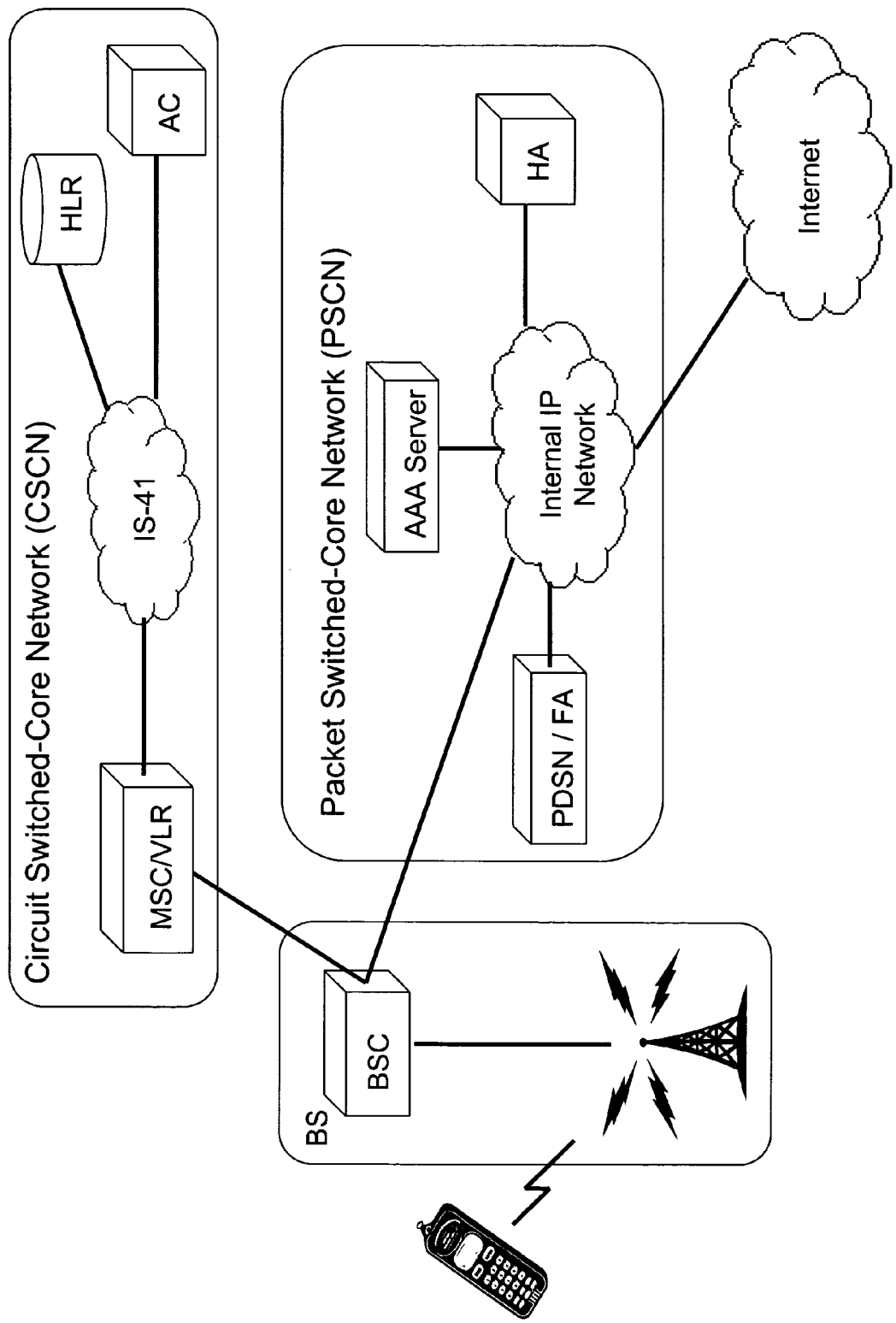
FIG. 1 illustrates a cdma2000 network architecture.
Figure 2:
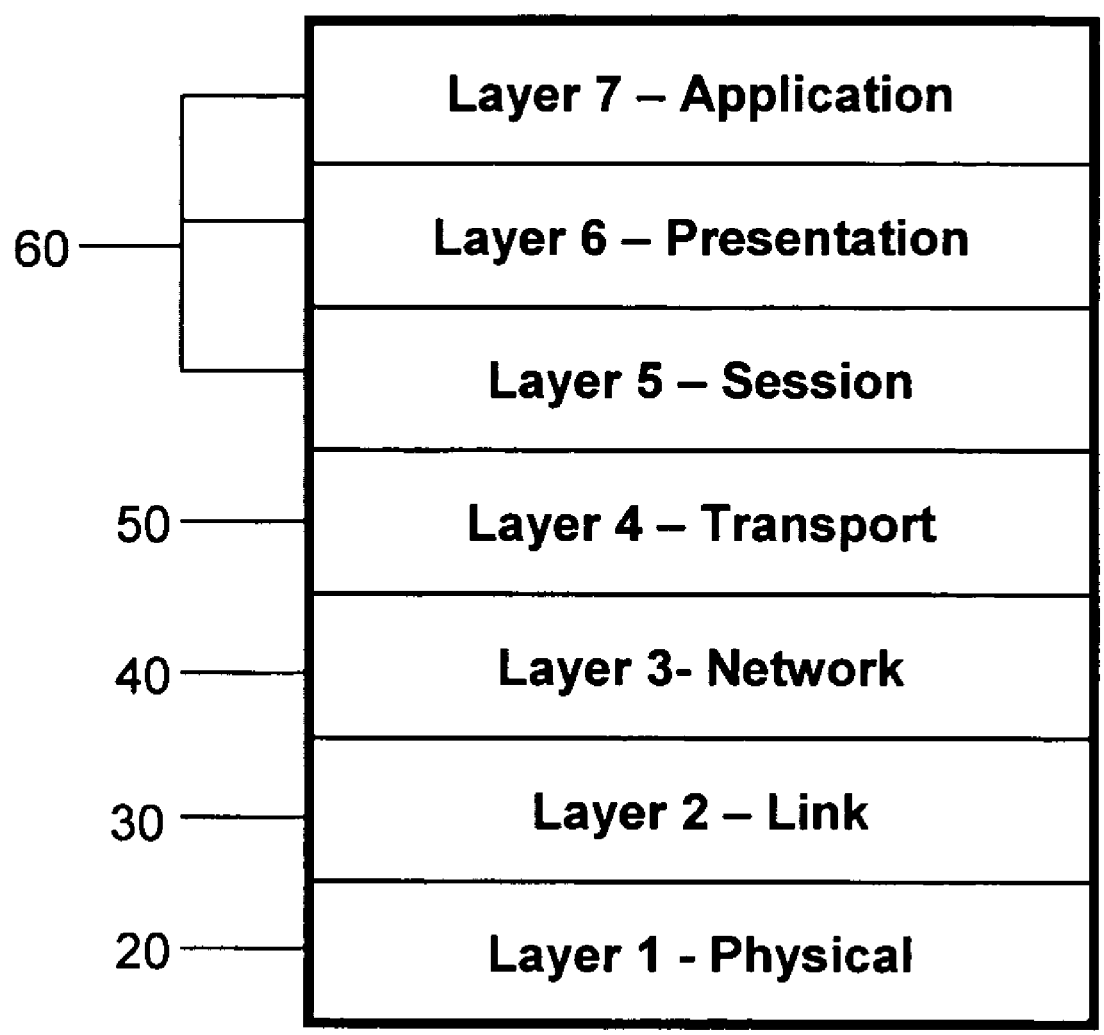
FIG. 2 illustrates a layered architecture diagram of the cdma2000 system.
Figure 3:
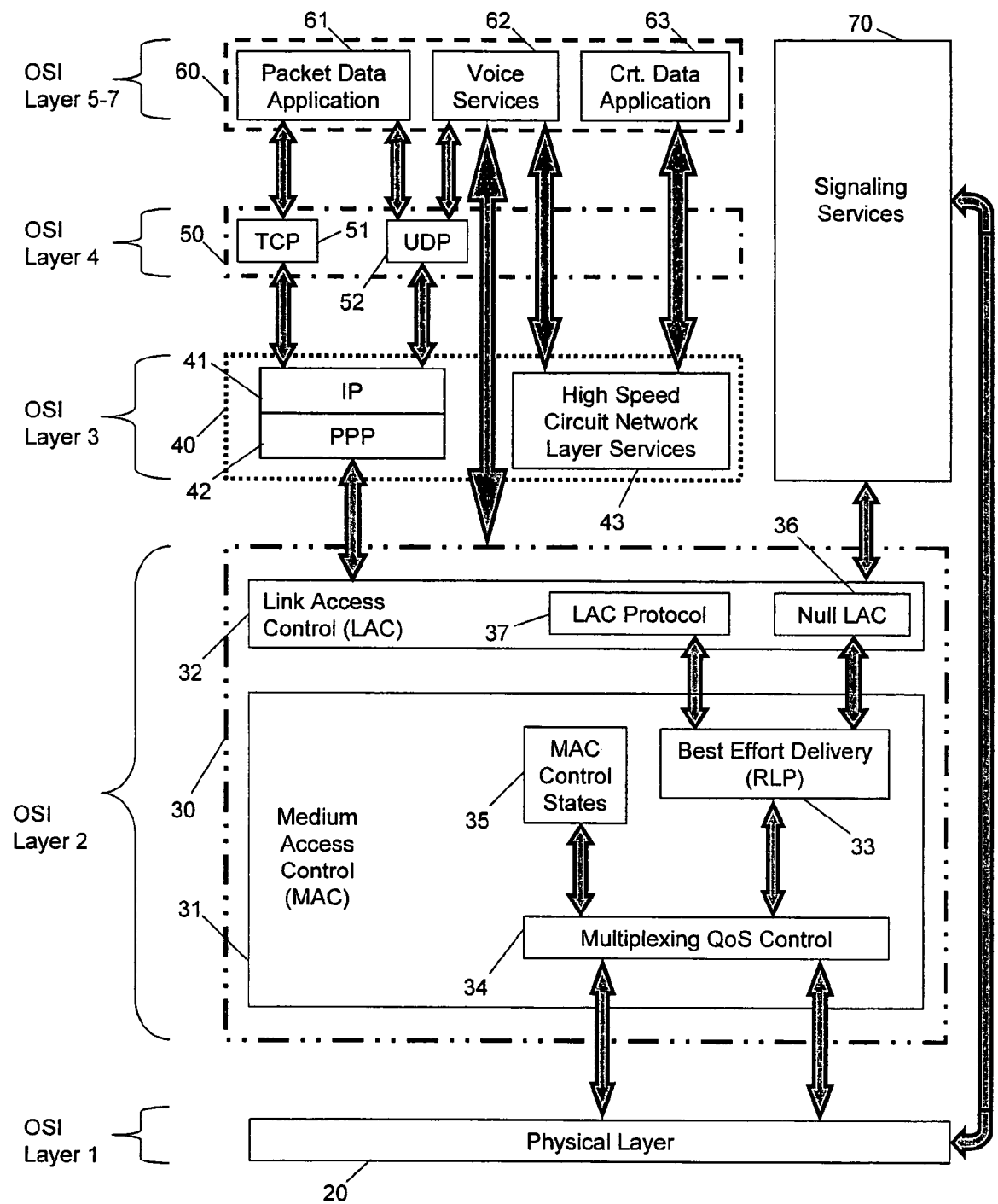
FIG. 3 illustrates the data link protocol architecture layer for a wireless network, and more particularly for a cdma2000 system.
Figure 4:
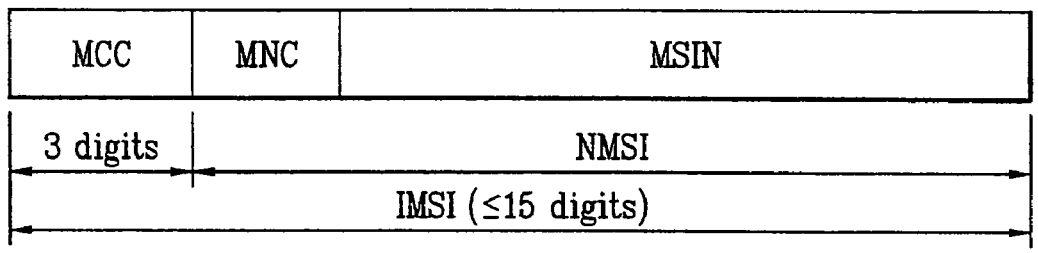
FIG. 4 illustrates the structure of IMSI, according to ITU-T E.212.
Figure 5:
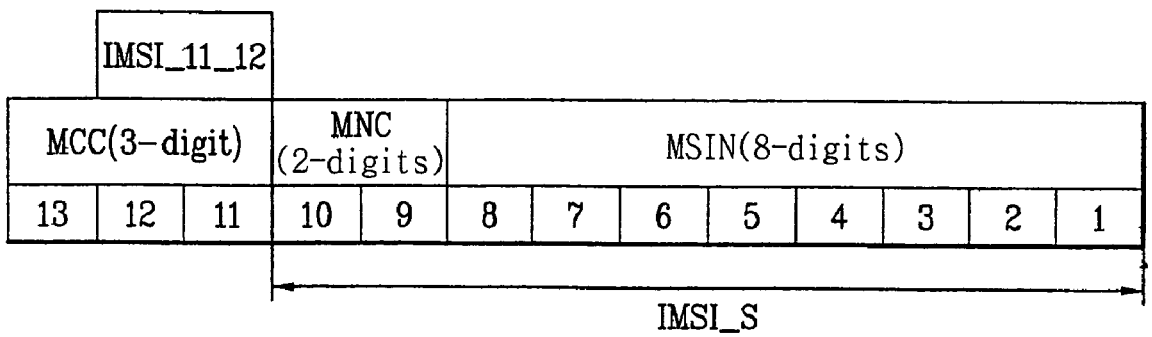
FIGS. 5 to 8 illustrates the exemplary structures wherein 11th and 12th digits (IMSI_11_12) of IMSI are constructed with values unrelated to MNC.
Figure 6:
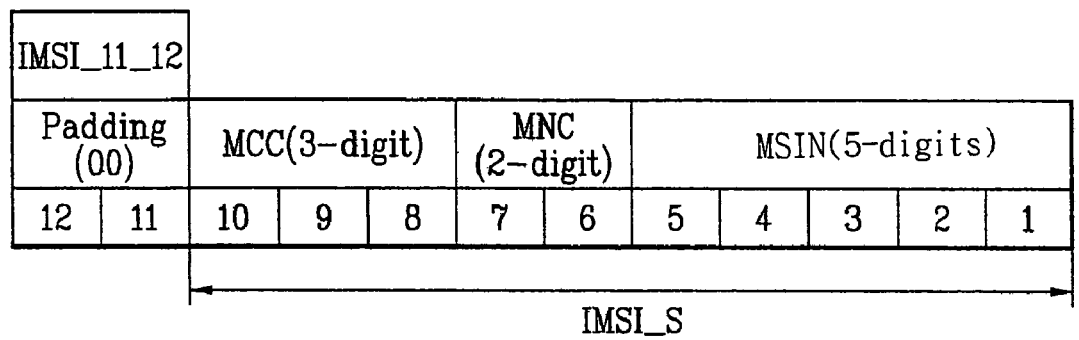
Figure 7:
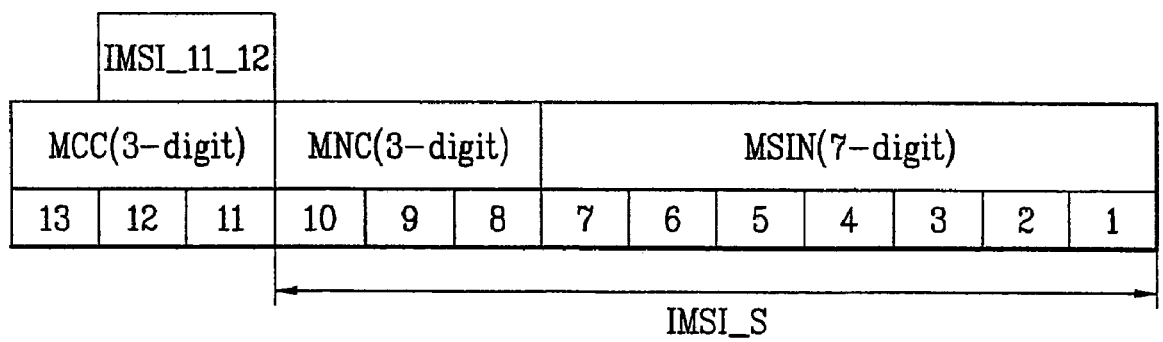

To aid describing the present invention, certain exemplary parameter names, values, lengths and other attributes are being used to describe the channels, messages and fix or variable identifiers communicated between mobile and base stations. It should be noted that such parameter names are for illustration purposes only, and that other names may be used to describe the same or similar function.

In accordance with one or more embodiments of the invention, a data structure for identifying a mobile communications device in a cdma2000 network is provided. The data structure comprises at least one of a first field, a second field, and a third field. The first field is associated with a 3-digit mobile country code (MCC) for identifying a country to which the mobile communications device belongs. The second field (IMSI_11_12) is associated with a 2- or 3-digit mobile network code (MNC) for identifying a network to which the mobile communications device belongs in the country. The third field (IMSI_S) is associated with a mobile station identification number (MSIN) for identifying the mobile communications device in the network.

In certain embodiments, a flag is set to indicate whether MNC is 2 or 3 digits long. When the length of the MNC is 2 digits, then the second field (IMSI_11_12) comprises the 2-digit MNC. When the length of the MNC is 3 digits, then the second field (IMSI_11_12) comprises a first part of the 3-digit MNC and the third field (IMSI_S) comprises a second part of the 3-digit MNC. That is, IMSI_11_12 includes at least the first 2 digits of the MNC, for example. And the third field (IMSI-S) comprises the last digit of the MNC, for example.

In one embodiment, the third field (IMSI_S) also comprises a mobile station identification number (MSIN) for identifying the mobile station in the network. The least significant positions of the third field (IMSI_S) comprise the MSIN. As noted above, the most significant positions of the third field (IMSI_S) comprise the second part of the MNC, when the length of the MNC is greater than the length of the second field (e.g., when MNC is 3 digits). And, the most significant position of the third field (IMSI_S) comprises the least significant digit of the MNC.

If the length of the MSIN is smaller than the length of the third field (IMSI_S), then the third field (IMSI_S) also comprises padding bits. Particularly, the most significant positions of the third field (IMSI_S) comprise the padding bits, when the length of the MNC is not greater than the length of the second field (e.g., when MNC is 2 digits). Otherwise (e.g., when MNC is 3 digits), the padding bits are inserted between the least significant digit of the MNC and the most significant digit of the MSIN.

Referring to FIGS. 9 to 12, in accordance with one or more embodiments, exemplary IMSI structures are provided, wherein IMSI_11_12 comprises the most significant digits of the MNC, as provided in ITU-T E.212. Particular examples are discussed below, for the purpose of illustration in more detail. It should be noted, however, that such details are by way of example, and the scope of the invention is not limited to such details.

Figures 8, 9:
FIGS. 9 to 12 are exemplary IMSI structures, wherein IMSI_11_12 digits coincide with the MNC field, as provided in ITU-T E.212, according to one or more embodiments of the present invention.

Referring to FIG. 9, in a class 1 IMSI, having an overall length smaller than 15 digits, padding bits are inserted at the most significant portion of IMSI_S. This padding method increases the overall length of IMSI to 15 digits. For example, if a mobile station uses an 8-digit MSIN, a 2-digit MNC, and a 3-digit MCC, the padding bits are inserted in the most significant 2 digits of IMSI_S so that IMSI_S is 10 digits. Hence, IMSI is restructured from 8 digits to 10 digits to allow the IMSI_11_12 field to comprise the MNC bits.

Thus, as shown in FIG. 9, in an exemplary embodiment, MCC, MNC, and MSIN are 3-, 2-, and 8-digits, respectively. Padding bits (e.g., '00') are inserted to form the most 2 significant digits of MSIN so that the IMSI_11_12 field comprise the 2 digits of MNC. The resulting IMSI structure is then designated to a mobile station, which forwards the various fields in the IMSI to a base station, either individually or collectively.

The IMSI_S comprises a 2-digit padding value (e.g., '00') inserted to form the most significant 2 digits of the MSIN. As such, when the IMSI of FIG. 9 is assigned to a mobile station, a cdma2000 base station receives the IMSI from the mobile station and reads IMSI_11_12 to determine the network and the country to which a corresponding mobile station belongs. The base station uses the 3-digit MCC for identifying a country to which the mobile station belongs, the 2-digit IMSI_11_12 for identifying a network to which the mobile station belongs in the country according to MCC, and the 10-digit IMSI_S for identifying the mobile station, for example.

Figure 10:
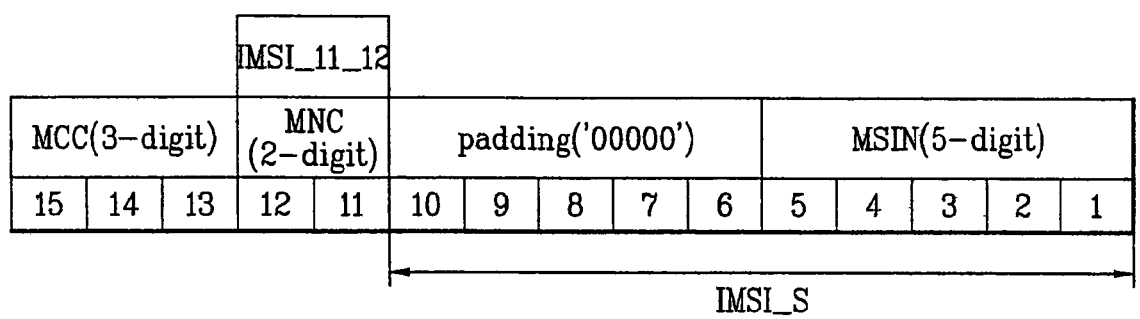

Referring to FIG. 10, in another embodiment, when a mobile station uses a 5-digit MSIN, a 2-digit MNC, and a 3-digit MCC, for example, padding bits are inserted in the most significant 5 positions of the IMSI_S. The IMSI_S is 10 positions long and comprises the MSIN. Hence, addition of the padding bits allows IMSI_11_12 field to comprise MNC digits. To accomplish the above, padding bits (e.g., '00000') are inserted to form the most significant 5 digits of the MSIN so that IMSI_11_12 field comprises the 2-digit of MNC.

As a result, the IMSI structure is designated to a mobile station with a 3-digit MCC for identifying a country to which the mobile station belongs, a 2-digit IMSI_11_12 for identifying a network to which the mobile station belongs in the country according to MCC, and a 10-digit IMSI_S for identifying the mobile station.

The IMSI_S comprises a 5-digit padding value inserted in the 5 most significant positions before the 5-digit MSIN, as shown. As such, when the IMSI of FIG. 10 is assigned to a mobile station, a cdma2000 base station can receive the IMSI from the mobile station and read IMSI_11_12 to determine the network and the country to which a corresponding mobile station belongs.

Figure 11:
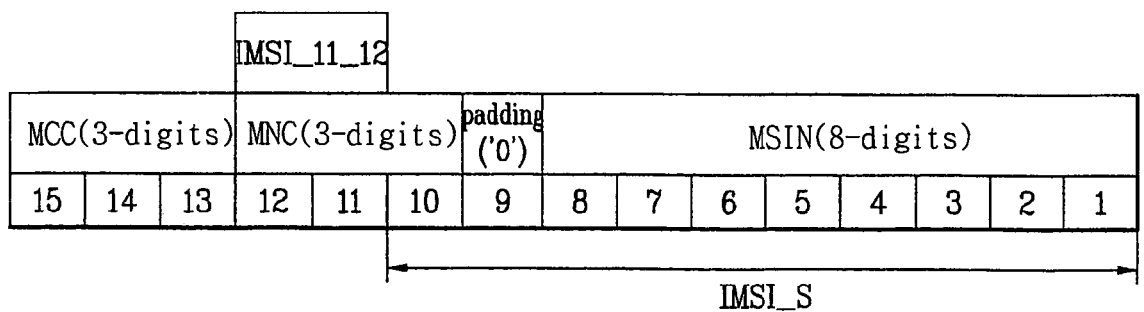

Referring to FIG. 11, when a mobile station uses an 8-digit MSIN, a 3-digit MNC, and a 3-digit MCC, for example, a padding value (e.g., '0') is inserted in the penultimate most significant digit (e.g., $9^{th}$ digit) of the IMSI_S field. As such, IMSI_S is 10 digits and is used to provide the MSIN (digits 1–9) and a part of MNC (digit 10), as shown.

In the exemplary embodiment of FIG. 11, MCC, MNC, and MSIN are 3-, 3-, and 8-digits, respectively. Hence, padding bits (e.g., '0') are inserted to the left of the most significant digit of MSIN. The least significant digit of MNC is positioned to the left of the padding bits, wherein IMSI_11_12 are positioned to the left of the padding bits added to the 8-digit MSIN.

Accordingly, the IMSI comprises a 3-digit MCC for identifying a country to which the mobile station belongs, wherein the IMSI_11_12 comprises 2-digits of MNC for identifying a network to which the mobile station belongs in the country according to MCC, and a 10-digit IMSI_S for identifying the mobile station.

The IMSI_S comprises in the most significant position, the least significant digit of the MNC. The IMSI_S further comprises padding bits positioned to the left of the 8-digit MSIN. As such, when the IMSI of FIG. 11 is assigned to a mobile station, a cdma2000 base station receives the IMSI from the mobile station and reads IMSI_11_12 to determine the network and the country to which a corresponding mobile station belongs.

Figure 12:
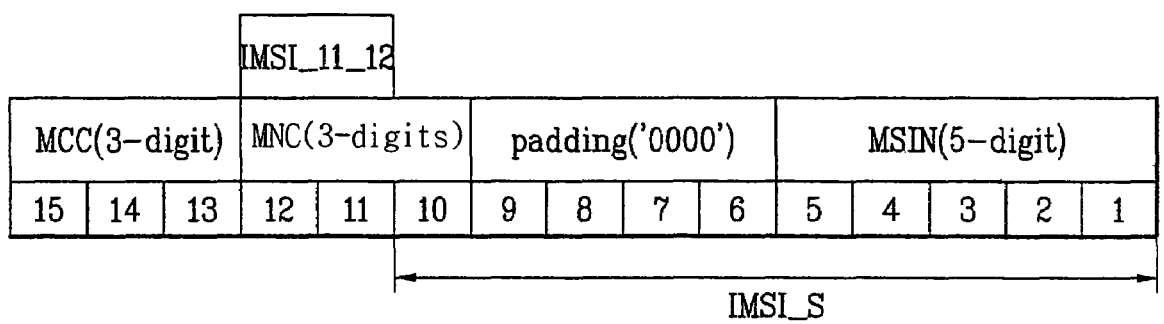

Referring to FIG. 12, when a mobile station uses a 5-digit MSIN, a 3-digit MNC, and a 3-digit MCC, for example, padding bits are inserted in the 4 most significant positions (e.g., positions 6-9) of IMSI_S, except for the most significant digit (e.g., $10^{th}$ digit).

In the exemplary structure illustrated in FIG. 12, MCC, MNC, and MSIN are 3-, 3-, and 5-digits, respectively, and the length of IMSI is 10-digits. Padding bits (e.g., '0000') are inserted to the left of the most significant digits of MSIN. IMSI_11_12 field comprises the most significant 2 digits of MNC, and the least significant digit of the MNC is inserted in the most significant position of IMSI_S.

As such, the IMSI comprises a 3-digit MCC for identifying a country to which the mobile station belongs, a 2-digit IMSI_11_12 comprising a first part (e.g., 2 digits) of MNC for identifying a network to which the mobile station belongs in the country according to MCC, and a 10-digit IMSI_S for identifying the mobile station.

The IMSI_S comprises the least significant digit of MNC and the 9 digits attained from inserting a 4-digit padding value to the left of the 5-digit MSIN. As such, when the IMSI of FIG. 12 is assigned to a mobile station, a cdma2000 base station receives the IMSI from the mobile station and reads IMSI_11_12 to determine the network and the country to which a corresponding mobile station belongs.

In accordance with one embodiment, by including the MNC in the IMSI_11_12 field, a base station can determine the network and country to which a mobile station belongs, while the mobile station is roaming. In some embodiments, IMSI_11_12 can be used for billing purposes, according to international roaming services. Thus, the present invention simplifies the billing procedures for a mobile phone that is internationally roaming in a cdma2000 network.

Figure 13:
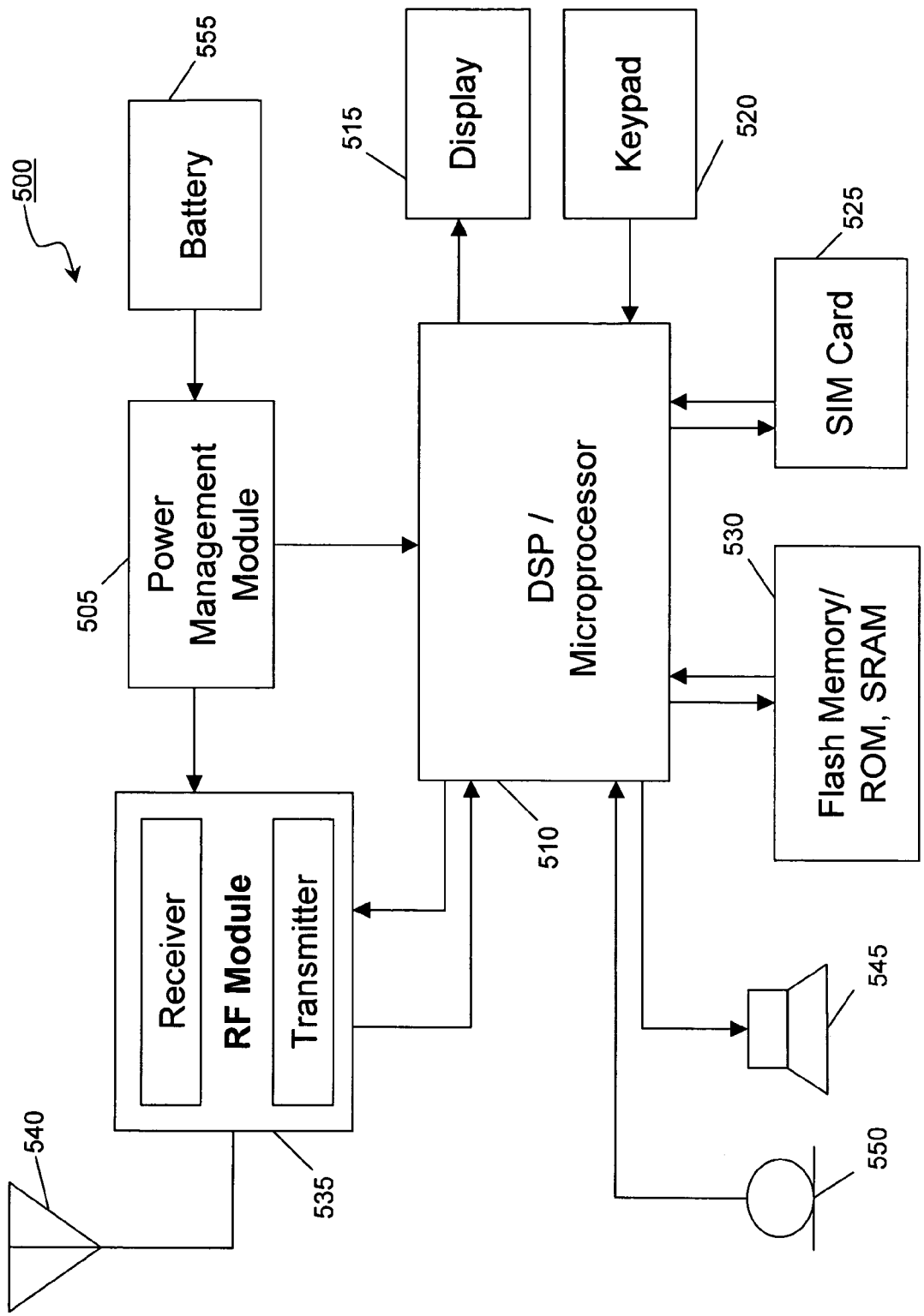
FIG. 13 illustrates a block diagram of mobile station according to a preferred embodiment of the present invention.

FIG. 13 illustrates a block diagram of mobile station according to the preferred embodiment of the present invention.

Referring to FIG. 13, the mobile station 500 comprises a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF section 535, to initiate communication, for example, transmit radio signals comprising voice communication data. The RF section 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example.

It will be apparent to one skilled in the art that the preferred embodiments of the present invention can be readily implemented using, for example, a suitably programmed digital signal processor (DSP) or other data processing device, either alone or in combination with external support logic.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A method of identifying a mobile terminal in a mobile communications network, the method comprising:
    determining an international mobile station identity (IMSI) for a mobile terminal, the IMSI comprising a mobile country code (MCC), a mobile network code (MNC) and a mobile station identifier number (MSIN);
    determining a first field having a first fixed length and containing the MCC;
    determining a second field having a second fixed length and containing at least a part of the MNC;
    determining a third field having a third fixed length containing the MSIN and at least one padding value, when length of the MSIN is less than the third fixed length,
        wherein when the length of the MNC is greater than the second fixed length, then the MNC is parsed into at least a first part and a second part, so that the second field comprises the first part and the third field comprises the MSIN and the second part; and
    wherein, when total length of the MSIN and the second part is less than the third fixed length, then at least one padding value is added to the third field; and transmitting the first, second and third fields to the mobile communications network.

2. The method of claim 1, wherein when length of the MNC is equal to the second fixed length, the second field comprises the MNC, and the third field comprises the MSIN.

3. The method of claim 1, wherein sum of the first fixed length, the second fixed length and the third fixed length is equal to 15 digits.

4. The method of claim 1, wherein the first fixed length is equal to 3.

5. The method of claim 1, wherein the second fixed length is at least 2.

6. The method of claim 1, wherein the third fixed length is 10.

7. The method of claim 1, wherein the first part of the MNC comprises most significant digits of the MNC.

8. The method of claim 1, wherein the second part of the MNC comprises least significant digit of the MNC.

9. The method of claim 1, wherein when length of the MNC is greater than the second fixed length, and when total length of the MSIN and the second part is less than the third fixed length, then the at least one padding value is added to the third field between the MSIN and the second part.

10. The method of claim 1, wherein when length of the MNC is not greater than the second fixed length, and when total length of the MSIN is less than the third fixed length, then the at least one padding value is inserted in most significant position of the third field.

11. A system using a data structure for identifying a mobile communications device in a cdma2000 network, the data structure comprising at least one of a first field, a second field, and a third field, wherein:
    the first field comprises an X-digit mobile country code (MCC) for identifying a country to which the mobile communications device belongs;
    the second field comprises a Y-digit mobile network code (MNC) for identifying a network to which the mobile communications device belongs, when Y is not greater than length of the second field;
    the second field comprises at least a first part of the Y-digit MNC, when Y is greater than length of the second field; and
    the third field comprises:
        a second part of the Y-digit MNC, when Y is greater than length of the second field;
        a Z-digit mobile station identification number (MSIN) for identifying the mobile communications device in the network; and
        padding bits, when Z+ length of the second part of the Y-digit MNC is smaller than length of the third field (IMSI_S).

12. The system of claim 11, wherein the first part of the MNC comprises most significant digits of the MNC.

13. The system of claim 11, wherein the second part of the MNC comprises least significant digits of the MNC.

14. The system of claim 11, wherein least significant positions in the third field comprise the MSIN.

15. The system of claim 11, wherein most significant positions of the third field comprise the second part of the MNC, when Y is greater than the length of the second field.

16. The system of claim 11, wherein most significant positions of the third field (IMSI_S) comprise the padding bits, when Y is not greater than the length of the second field.

17. The system of claim 11, wherein X is equal to 3.

18. The system of claim 11, wherein Y is equal to at least 2.

19. The system of claim 11, wherein X+Y+Z is less than 16.

20. The system of claim 11, wherein the first part of the MNC is 2 digits, and the second part of the MNC is 1 digit.

21. A method for identifying a mobile communications device in a mobile communications network, the method comprising:
 determining an identifier for a mobile communications device, the identifier comprising at least one of a first field, a second field, and a third field;
 including in the first field a mobile country code (MCC) for identifying a country to which the mobile communications device belongs;
 including in the second field a mobile network code (MNC) for identifying a network to which the mobile communications device belongs in the country;
 including in the third field a mobile station identification number (MSIN) for identifying the mobile communications device in the network; and
 including padding values in the third field when length of the MSIN is less than length of the third field, the padding values added to the most significant portion of the third field when the length of the MNC is not larger than length of the second field.

22. The method of claim 21, wherein the padding values are added to most significant side of the MSIN, in the third field.

23. The method of claim 21, further comprising:
 dividing the MNC into a first part and a second part, when length of MNC is larger than length of the second field.

24. The method of claim 23, further comprising:
 including the second part of MNC in the third field.

25. The method of claim 23, further comprising:
 including the first part of MNC in the second field.

26. The method of claim 24, wherein the second part of MNC is included in most significant portion of the third field.

27. The method of claim 26, wherein the padding values are added between the second part of MNC and the MSIN, when total length of the MSIN and the least significant digit of MNC is smaller than the length of the third field.

* * * * *